INVENTORS
ELMER OLSON
LAWRENCE C. DERMOND
ATTORNEYS

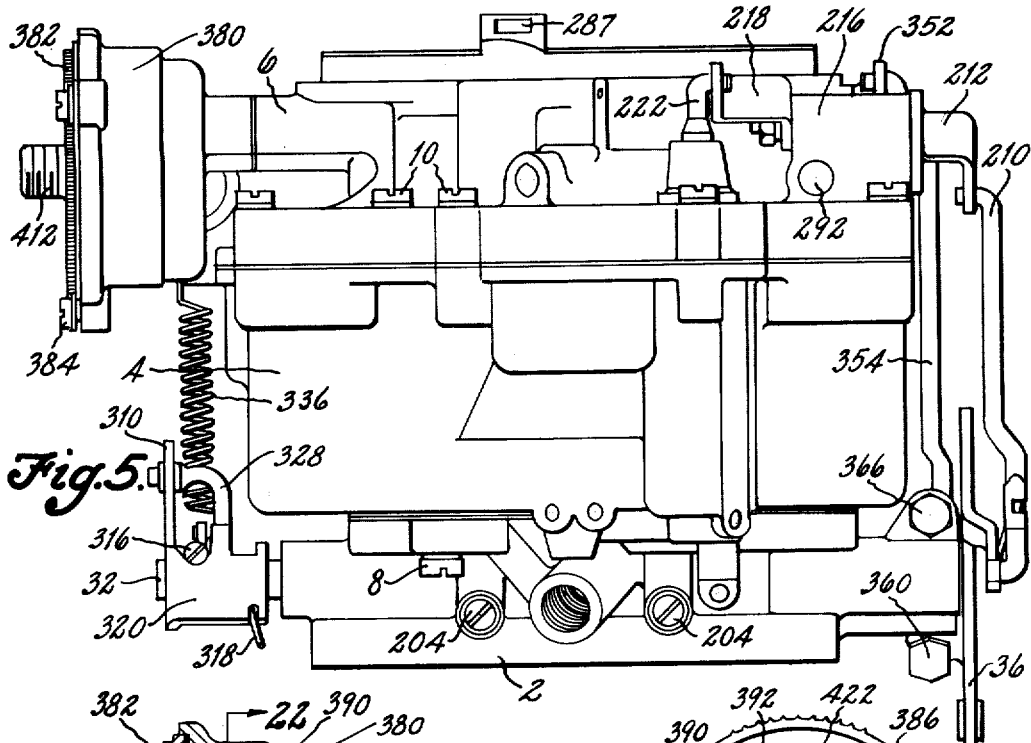
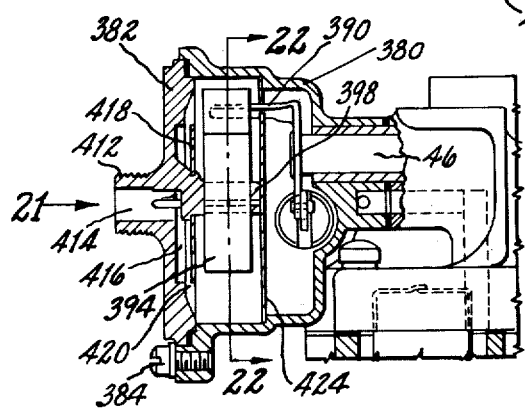
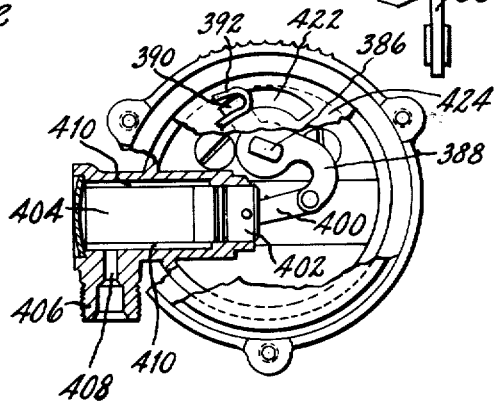
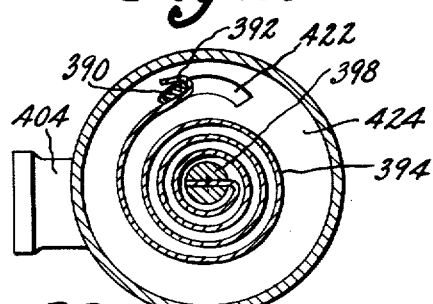

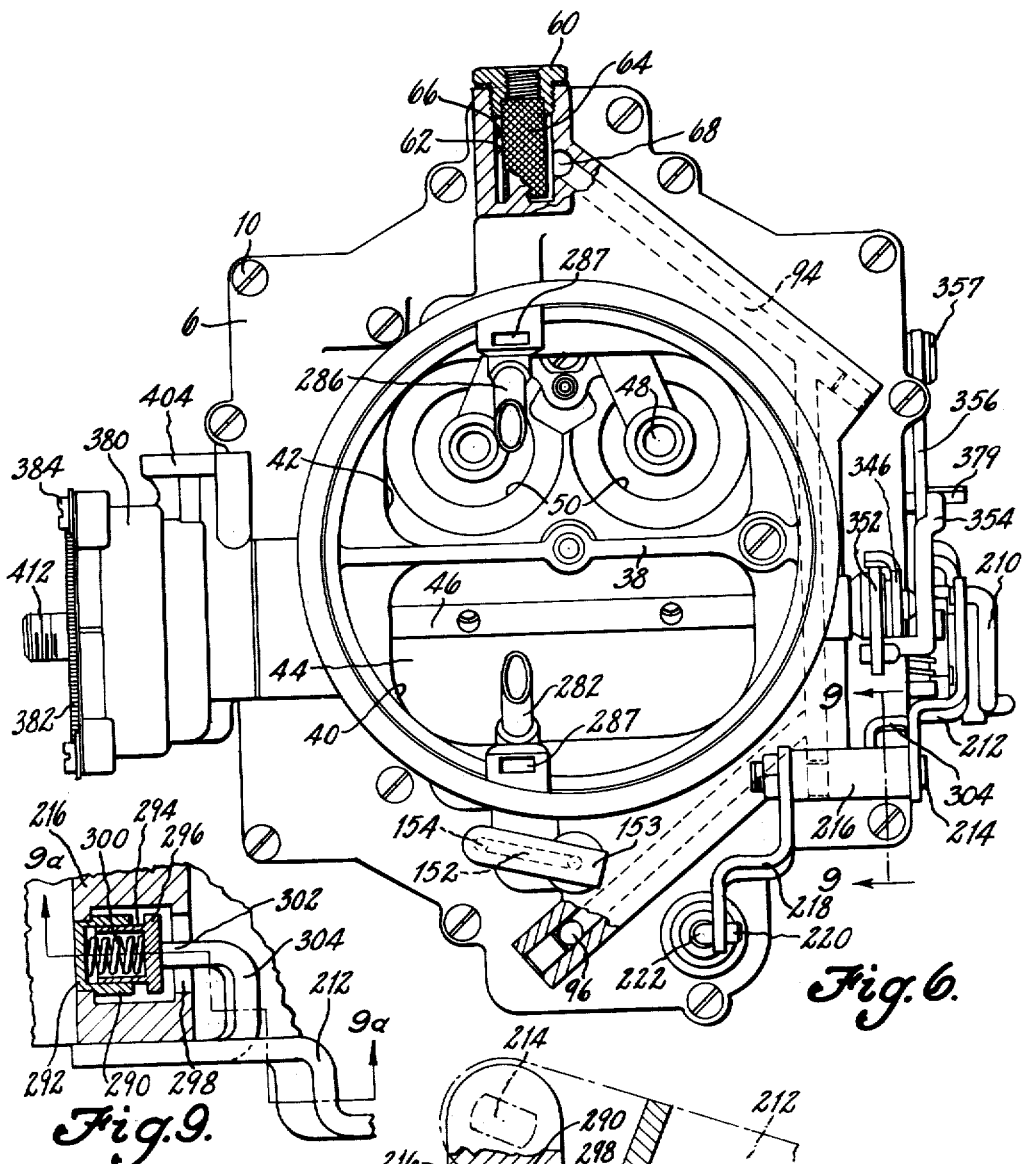
Fig. 6.
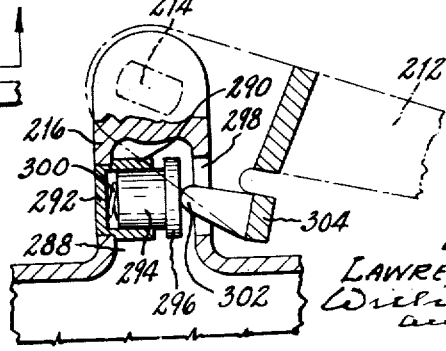
Fig. 9.
Fig. 9a.
INVENTORS
ELMER OLSON
LAWRENCE C. DERMOND
ATTORNEYS

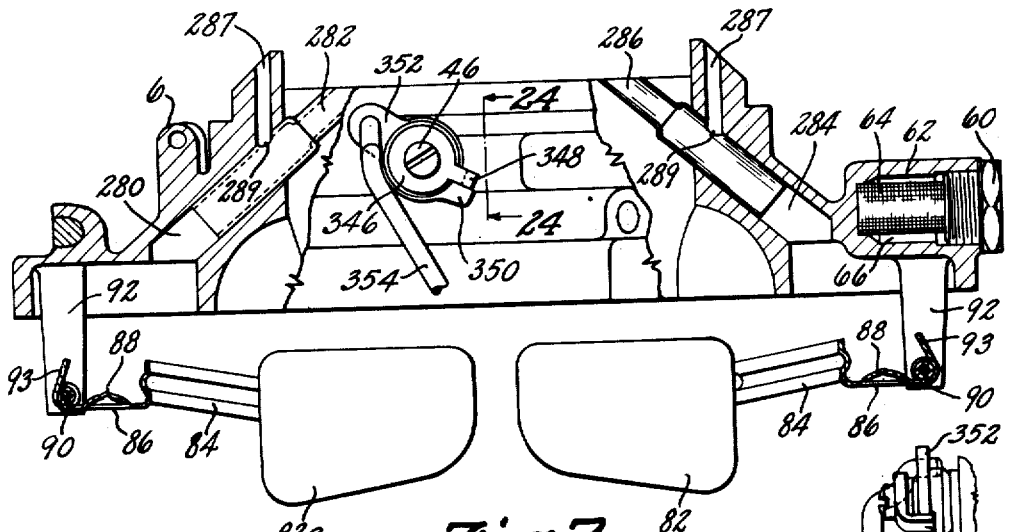
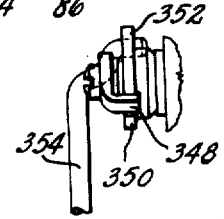
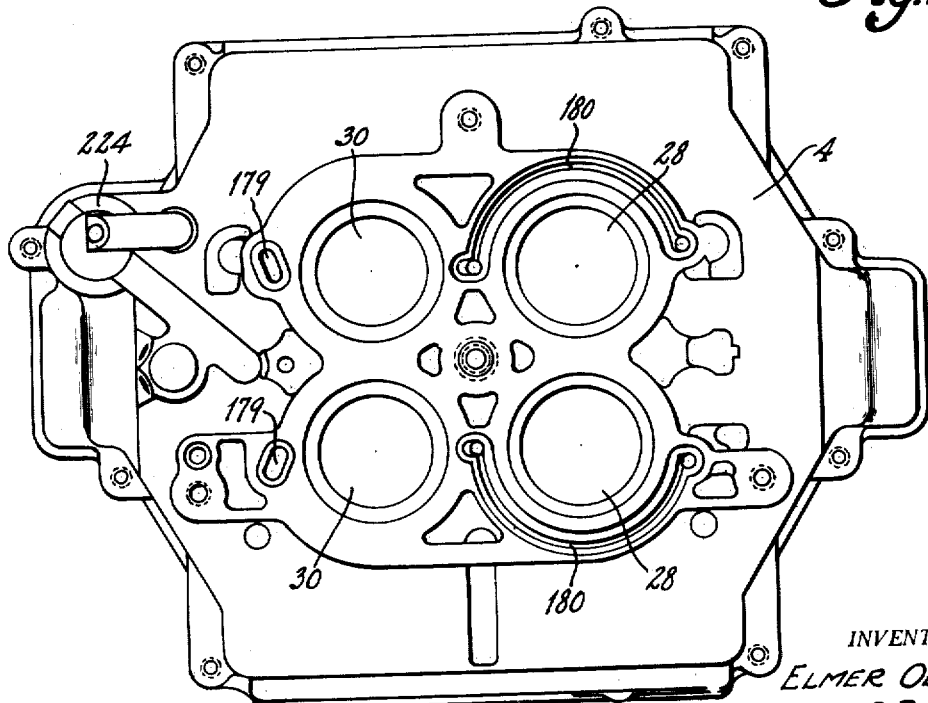

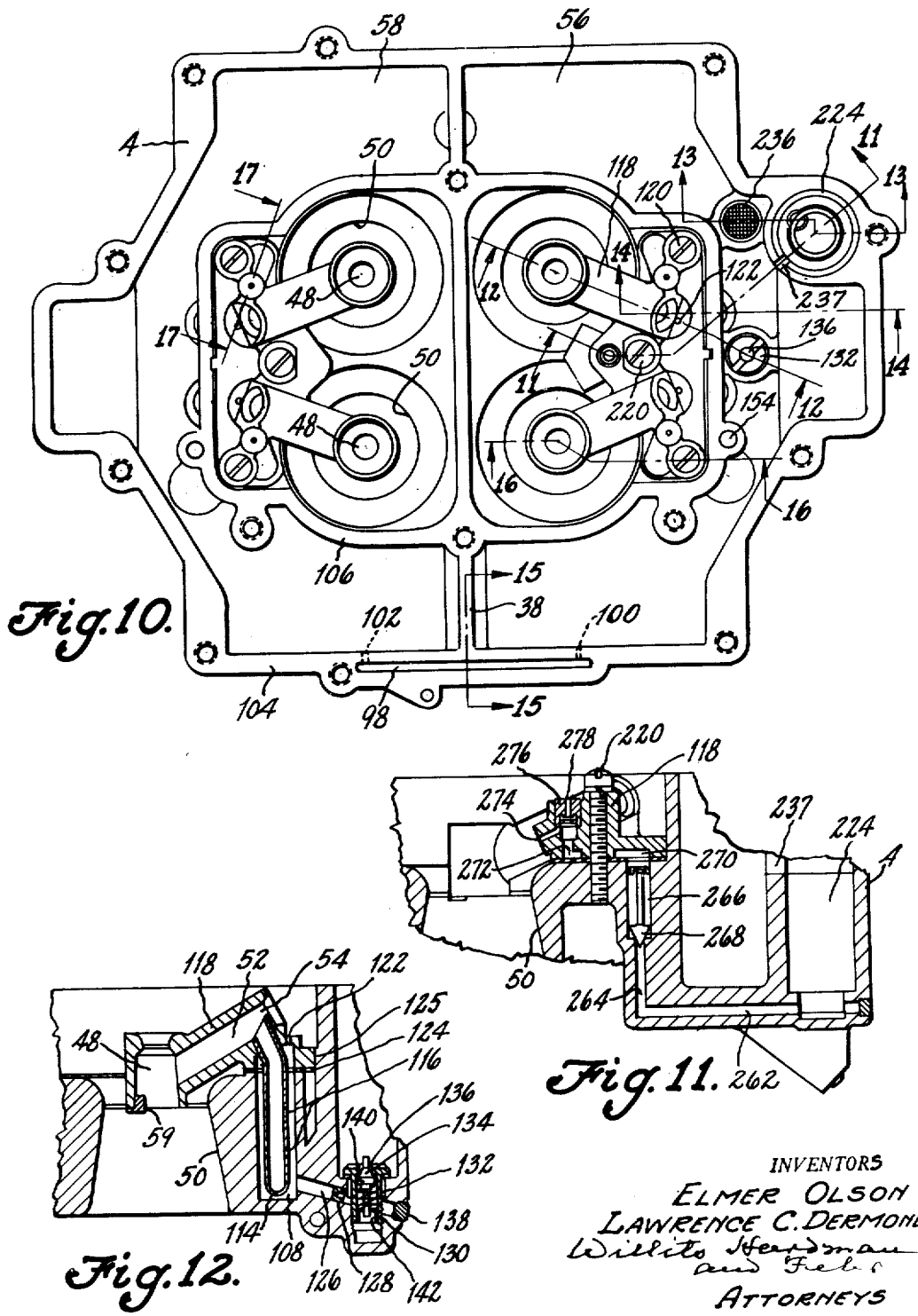

INVENTORS
ELMER OLSON
LAWRENCE C. DERMOND

ATTORNEYS

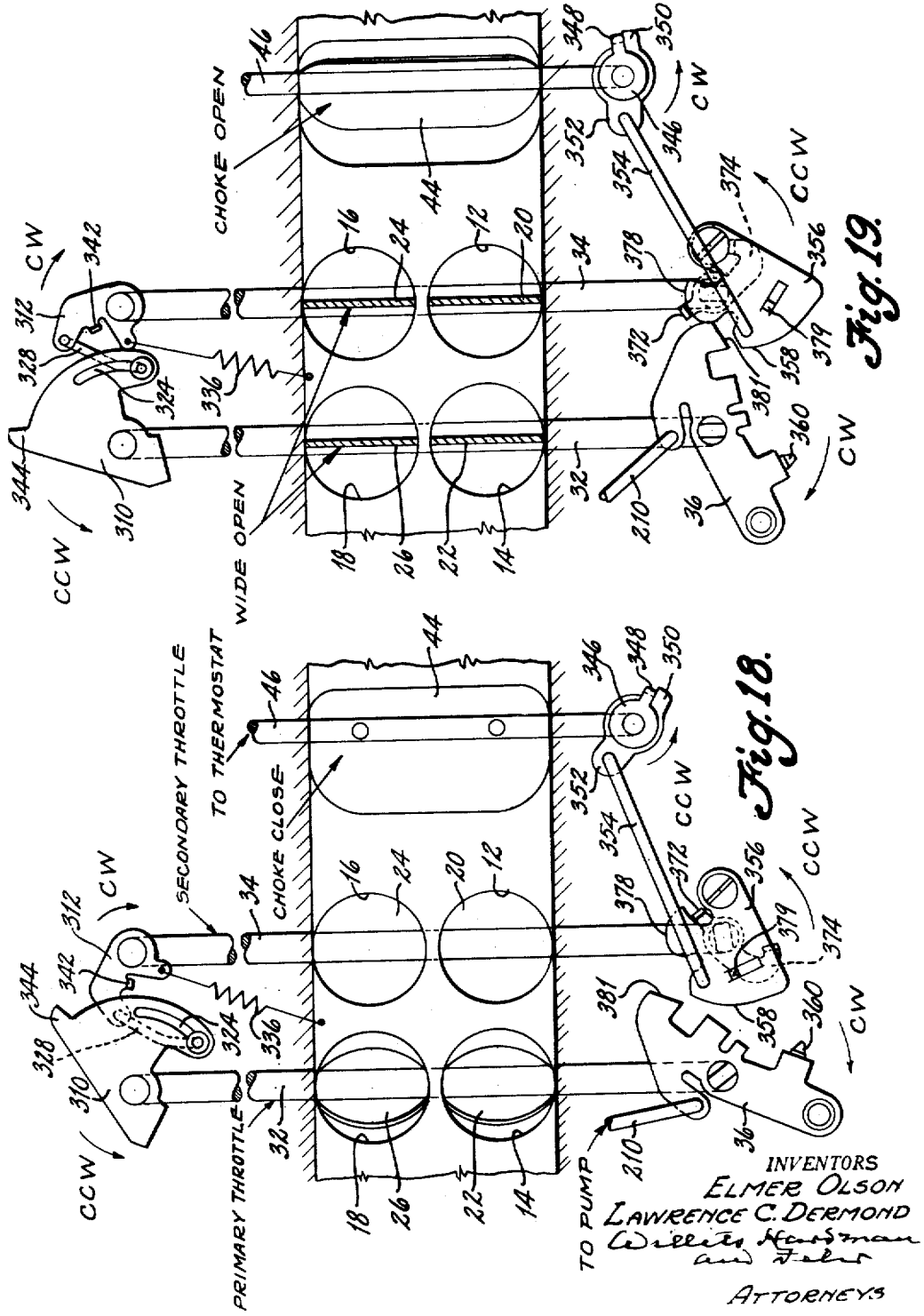

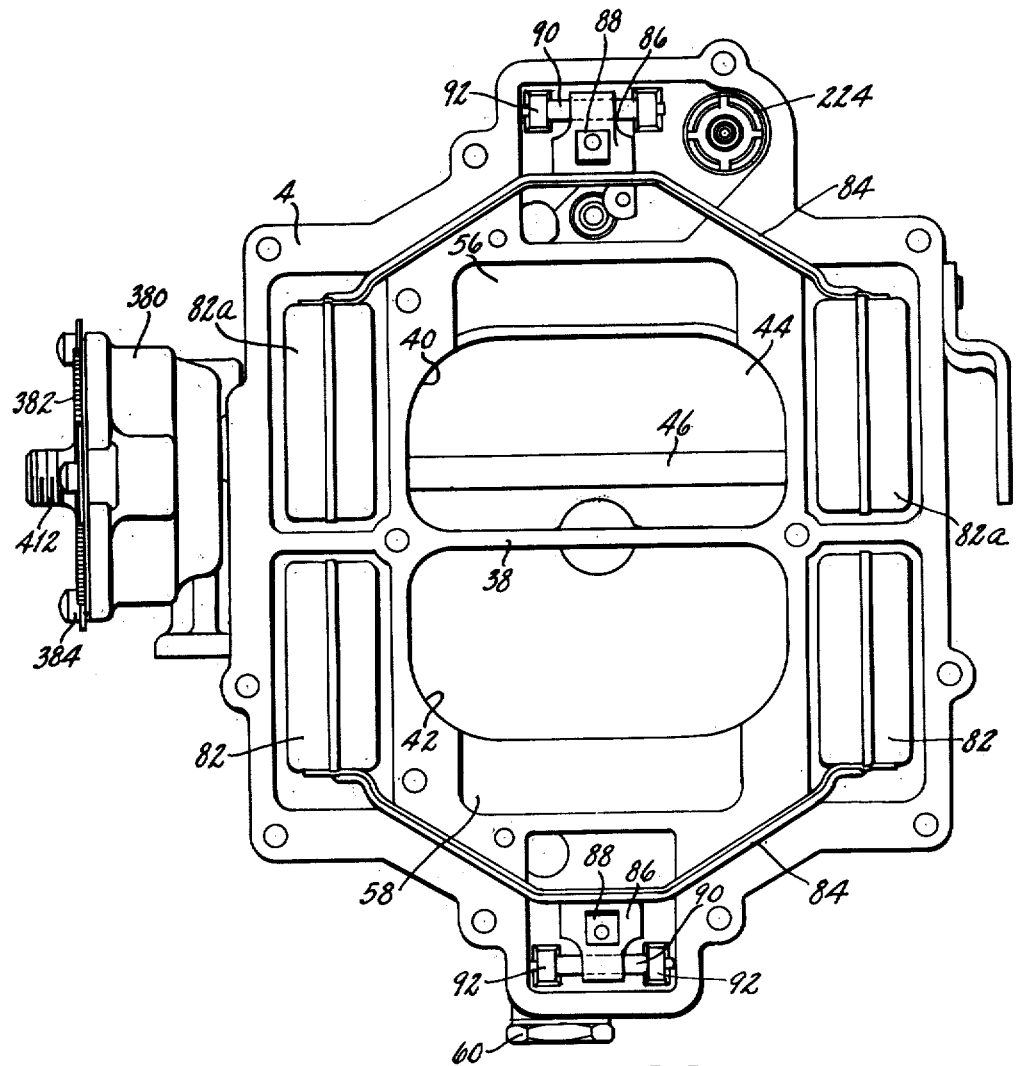

United States Patent Office 2,771,282
Patented Nov. 20, 1956

2,771,282

CARBURETOR

Elmer Olson and Lawrence C. Dermond, Rochester, N. Y., assignors to General Motors Corporation, Detroit, Mich., a corporation of Delaware Application December 29, 1951, Serial No. 264,136

26 Claims. (Cl. 261—23)

The present invention relates to carburetors for internal combustion engines, particularly to carburetors for use on engines used in automotive vehicles.

The principal purpose of this invention is to provide a carburetor capable of providing a sufficient quantity of mixture of the proper fuel ratio to produce great power and which is effective when operating conditions demand such power, but when less power is required, as when operating in the low and intermediate speed ranges, to bring about great efficiency and economy in engine operation, and which provides a mixture of the proper fuel-air ratio under all conditions of operation so that most satisfactory engine operation is obtained, no matter what the operating conditions may be.

With this general object in view, one of the features of the present invention resides in the provision of a single carburetor instrumentality having four separate mixture passages, which are, in effect, two primary carburetors operative to supply fuel mixture to the engine during operation at all speeds and under all conditions which are associated with what are in effect two secondary carburetors that are operative to supply fuel mixture to the engine only when the demand for power is great as when operating in the higher speed range, or under heavy load.

A further feature of the invention lies in the provision of a pair of simultaneously operated primary throttles for controlling the operation of the primary carburetors and operable throughout the entire range of operation of the device and a pair of secondary throttles for controlling the operation of the secondary carburetors which are designed to render said carburetors effective only when relatively high power is required, and which are operated by the primary throttle operating mechanism only after the primary throttles are opened to a predetermined extent.

An additional feature of the invention is the control of the primary carburetors, only, by an automatic choke mechanism operable in response to variations in temperature and engine suction and the provision of means operated by the choke mechanism for locking the secondary throttles against opening until a predetermined temperature is reached and a specific feature of this mechanism is the utilization of the conventional fast idle cam to control the action of the locking device.

Another feature of the invention is a means for permitting the primary throttles to be opened to wide open position before the temperature reaches the point at which the secondary throttles are unlocked to permit opening movement thereof.

A still further feature of the invention is a mechanically operated vent valve which is opened by the means for operating the accelerator pump when the primary throttles are moved to closed position and is effective to open a vent passage in order to permit escape of vapor from the space above the fuel in the float chambers to the outside air but which is closed at all times during engine operation except when the throttle is nearly closed, as when the engine is idling.

Another feature of the invention is the arrangement of separate fuel chambers for supplying fuel to the primary and secondary carburetors which may be termed primary and secondary fuel chambers and are separated by a partition wall and a passage in the outside wall extending to both sides of the partition wall and having openings into each fuel chamber substantially at the fuel level so as to permit fuel to flow from one chamber to the other upon tilting of the carburetor.

The arrangement of the several main vented fuel wells which is effective to prevent percolation is also a feature of the invention. In each of the wells a fuel supply passage is separated from the wall of the well and has a closed lower end while a series of openings in the vertical wall of the passage connect with the well and a vent is provided in the top of the well, the construction being effective to permit escape of fuel vapor without forcing liquid fuel from the well or supply passage.

Another feature of the invention lies in the provision of means to supply idling mixture to the primary carburetors only, such means including idle fuel supply passages extending from wells connected with the secondary fuel chamber and other idle fuel supply passages extending from wells connected with the primary fuel chamber to the primary mixture passages, said idle fuel supply passages being connected with the primary mixture passages on opposite sides thereof, and so related to the throttles that those leading from the secondary fuel chamber are on the posterior side of the primary throttles when the latter are in idling position, but are anterior to the primary throttles almost immediately after said throttles begin to open, so that the suction effective thereon is greatly reduced at the beginning of the opening movement of the throttles. A further specific feature of the idle system consists in a plurality of passages connecting the idle fuel supply passages with the primary mixture passages which, under some conditions, supply fuel and under other conditions act as vents, and are so arranged and calibrated that a mixture of the desired fuel-air ratio is supplied to the primary mixture passages during all idling and part throttle operation.

A still further feature of the invention lies in the provision of a suction operated means to effect the supply of additional fuel to the primary carburetors only when the power requirement is high as when operating at high speed or heavy load with open throttles.

Further objects and advantages of the present invention will be apparent from the following description, reference being had to the accompanying drawings wherein a preferred embodiment of the present invention is clearly shown.

In the drawings:

Fig. 5 is a view in elevation in the direction of the arrow in Fig. 2.

Fig. 6 is a plan view partly broken away to show certain details in section.

Fig. 7 is a section partly in elevation, through the top casting section.

Fig. 8 is a bottom view of the float chamber casting.

Fig. 9 is a detail section on the line 9—9 of Fig. 6.

Fig. 9a is a detail section on the line 9a—9a of Fig. 9.

Fig. 10 is a top plan view of the float chamber casting.

Figs. 11 to 17 inclusive are detail sections on the lines 11—11, 12—12, 13—13, 14—14, 15—15, 16—16 and 17—17 of Fig. 10.

Figs. 18 and 19 are exploded diagrammatic views showing in Fig. 18 the position of the parts with the primary throttles 40 degrees open with secondary throttles and choke closed, and in Fig. 19 the throttles fully open and the choke opened enough to release the lock.

Fig. 20 is a view partly in vertical section and partly in elevation of the automatic choke operating mechanism.

Fig. 21 is an elevation partly in section in the direction of the arrow in Fig. 20, with the cover plate removed.

Fig. 22 is a section on the line 22—22 of Fig. 20.

Fig. 23 is a bottom plan view of the air inlet casting 6 showing the float construction.

Fig. 24 is a detail section on the line 24—24 of Fig. 7.

Figure 4:
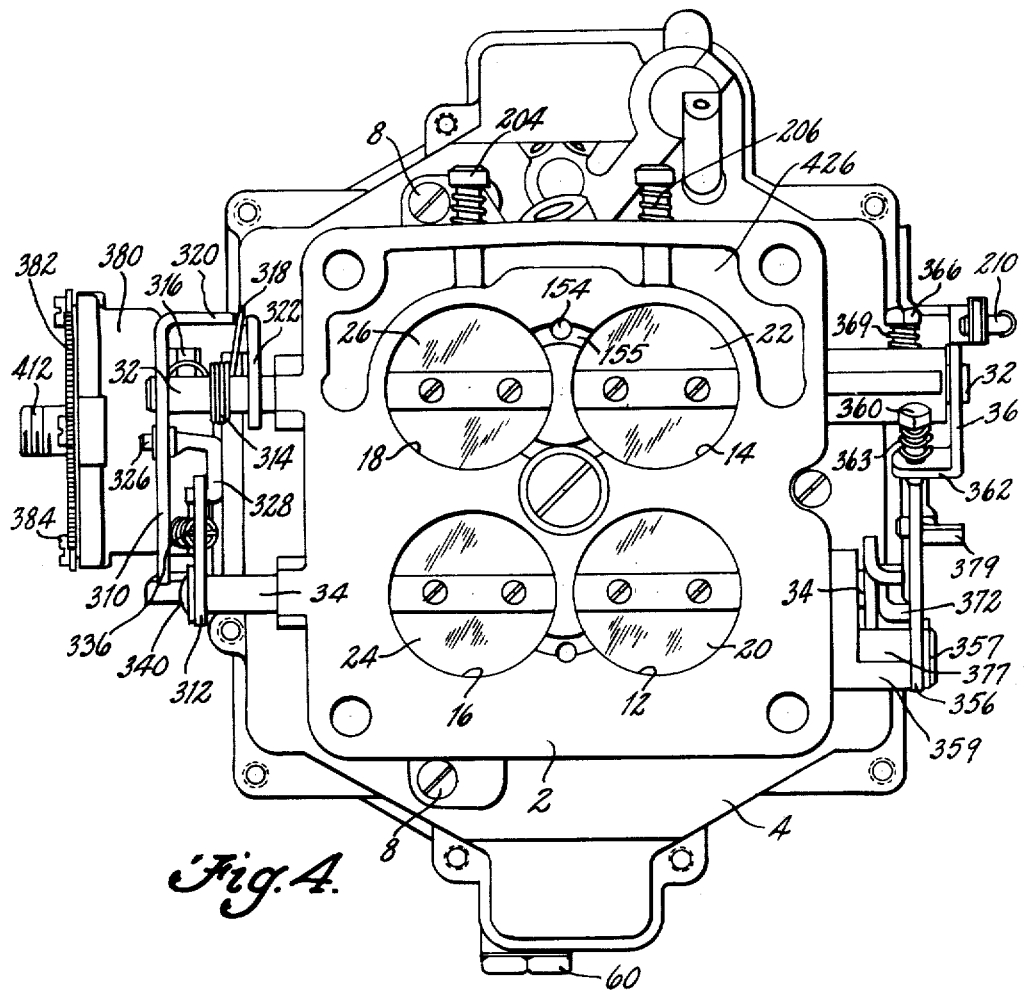
Fig. 4 is a bottom plan view of the carburetor showing the throttle controlled outlets and the throttle actuating mechanism.
Figure 25:
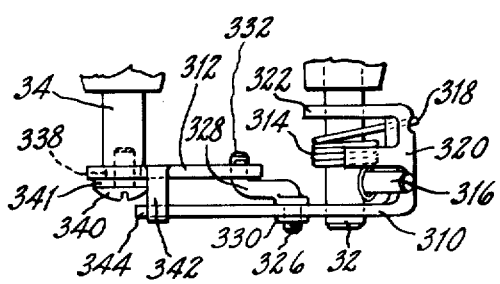

Fig. 25 is a top plan view of the throttle operating mechanism which is seen from the bottom in Fig. 4.

Figure 26:
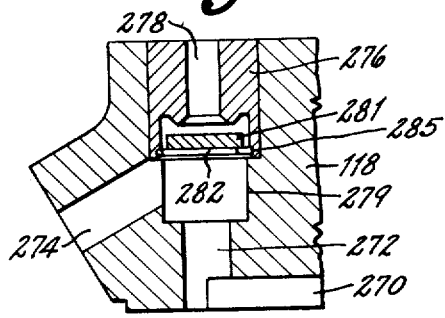

Fig. 26 is an enlarged detail view of the pump delivery passage.

Figure 1:
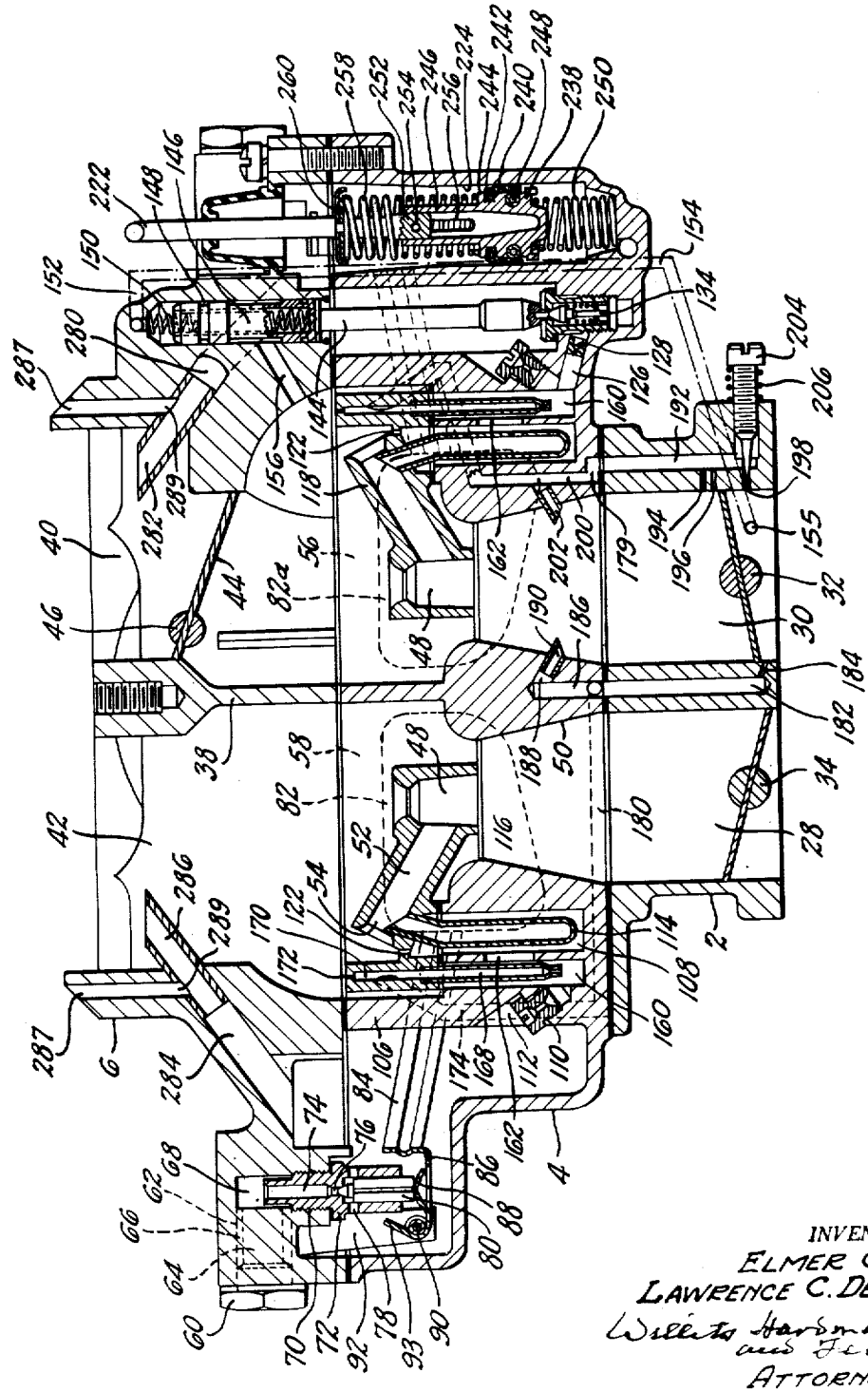
Fig. 1 is a diagrammatic section showing one primary and one secondary mixture passage, fuel supply passages therefor and the various control means.
Figure 2:
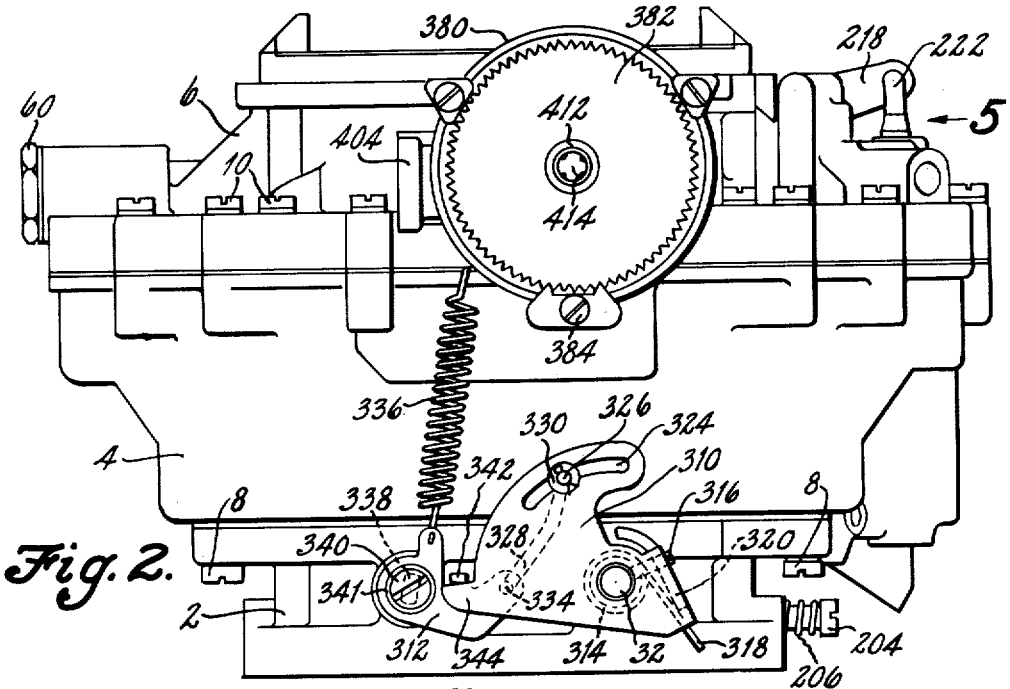
Fig. 2 is a side elevation showing the throttle operating mechanism on one side of the carburetor.
Figure 3:
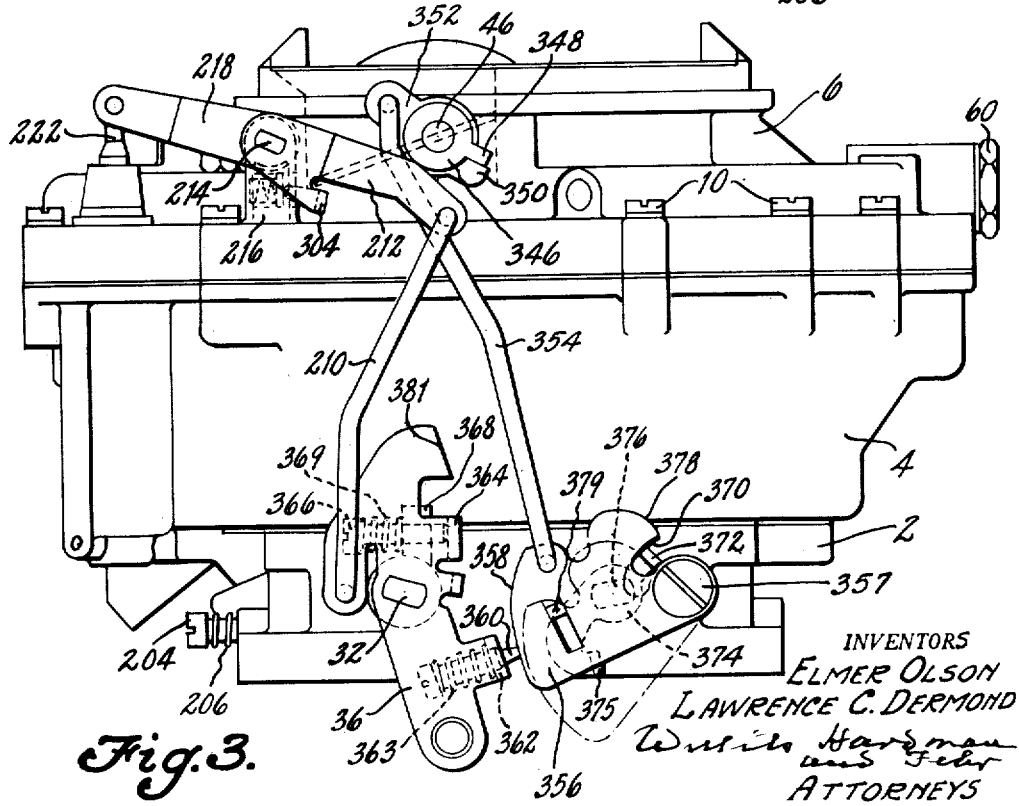
Fig. 3 is a side elevation of the opposite side of the carburetor.

As best shown in Figs. 1, 2 and 3, the carburetor comprises three separate castings 2, 4 and 6, the casting 2 being the throttle body casting which is adapted to be secured to the engine intake manifold when the carburetor is assembled in operative relation to the engine. The casting 4 which is above the casting 2 is the fuel bowl casting and is secured to casting 2 by screws 8 with suitable gaskets therebetween while the casting 6 is the air inlet casting which is positioned above the casting 4, being secured thereto by screws 10 with a suitable gasket between it and the casting 4.

The carburetor has four outlets 12, 14, 16 and 18 which are controlled, respectively, by four throttle valves 20, 22, 24 and 26, the throttle valves 20 and 24 being on a single operating shaft as are the valves 22 and 26. Each of the throttle valves controls the flow of combustible mixture from one of four mixture passages, two of which are shown in Fig. 1 and are numbered 28 and 30, and the other two passages are of the same construction as those shown. The passage 30 is one of two identical primary mixture passages while passage 28 is one of two identical secondary mixture passages.

It may be said that the carburetor is really two dual carburetors, each of which has a primary mixture passage such as 30 and a secondary mixture passage such as 28, both of which are embodied in one single instrumentality.

The primary mixture passages supply combustible mixture to the primary outlets 14 and 18 which are controlled by throttle valves 22 and 26 respectively, and the secondary mixture passages supply mixture to the outlets 12 and 16 controlled by throttle valves 20 and 24, respectively. The carburetor is designed to be associated with two manifold conduits, each of which is adapted to receive mixture from one primary and one secondary mixture passage. In other words, the primary outlet 14 and secondary outlet 12 are intended to supply mixture to one intake conduit while primary outlet 18 and secondary outlet 16 supply mixture to another conduit. However, the carburetor can be used with other manifold constructions and the specific manifold with which the carburetor is used is not material to the present invention.

The primary throttle valves are opened simultaneously and to the same extent, since they are mounted on a single shaft, and likewise both secondary throttles are opened simultaneously by a single shaft, but operating mechanism, which will be described later, is provided, by means of which the primary throttles are partly opened before the secondary throttles begin to open so that in the lower speed ranges only the primary throttles are open, but in the higher speed ranges the secondary throttles are also open so that all the mixture passages supply mixture to the engine when high power is needed. In the specific embodiment disclosed, the primary throttles are opened about 40°, before the opening of the secondary throttles begins, but the extent of opening of the primary throttles may be either greater or less than 40° if desired, for different installations.

Referring to Fig. 1, both the primary throttles are secured in any suitable way to an operating shaft 32 while both secondary throttles are secured to an operating shaft 34, both of said shafts being suitably journalled for rotation in the throttle body casting 2 and the primary throttle shaft 32 is operable by an arm 36 secured thereto and to which an operating linkage extending to the conventional accelerator pedal is adapted to be connected. The shaft 32 is also effective to operate the secondary throttle shaft 34 through mechanism which will be described later.

As will be apparent from Figs. 1 and 6, the two primary mixture passages 30 are separated from the two secondary mixture passages 28 by a partition wall 38 while a single air inlet 40 in the casting 6 admits air to both passages 30 and a single inlet 42 admits air to both secondary mixture passages 28. A choke valve 44 is secured in any suitable way to a shaft 46 suitably journalled in the casting 6, and is movable to different positions to variably control the admission to both primary mixture passages 30, but the air inlet 42 is not controlled by any valve. The valve 44 is unbalanced with respect to the shaft 46 so that the suction which is created in the mixture passages 30 tends to open the valve and the valve is also automatically controlled by temperature and the engine suction posterior to the throttle, by mechanism shown in Fig. 6 which will be later described. There is no choke valve for controlling the admission of air through the secondary inlets 28, such inlets being wholly unrestricted for reasons set forth later.

Fuel is introduced into each of the mixture passages through a fuel feeding element in the form of a small venturi tube 48 which is centrally located with respect to a large venturi tube 50 formed by the wall of each of the mixture passages. Fuel is conveyed to each of the small venturi tubes in the form of a primary mixture of fuel and air through a passage 52, which has an air inlet 54 which communicates with the mixture passage at a point anterior to the point of introduction of fuel therein. The primary mixture is mixed with additional air in the large venturi tubes 50. The main fuel supply passages just described are duplicated for each of the mixture passages and each passage 52 is supplied with fuel from one of four main fuel supply wells which will be described later. These wells are the same in construction and receive fuel from one or the other of two constant level fuel chambers 56 and 58 which are separated from each other by a downward extension of the partition plate 38 as best shown in Fig. 6. Fuel for idling is also supplied to the two primary mixture passages by means which will be later described, but no fuel for idling is supplied to the secondary mixture passages.

As shown in Fig. 12 a deflector element 59 is secured in any suitable way to the discharge end of each of the primary venturi tubes and projects into the tube to some extent. These deflectors are provided to control the distribution of mixture as it flows into the manifold, by causing a greater proportion of the mixture to flow through some particular part of the carburetor outlets and manifold inlets than in other parts thereof. These deflectors are necessary because the air cleaner and any bosses or other projecting elements which extend into the path of flow of the mixture through the intake passages change the pattern of the mixture as it leaves the carburetor and enters the manifold inlets. Also, with some manifolds it is necessary, for best results, that the mixture flowing into the manifold have an unsymmetrical pattern with respect to the manifold inlet. The deflectors are positioned to so control the pattern of the mixture entering the manifold that maximum torque and power are obtained.

Fuel is supplied to the chambers 56 and 58 through a nipple 60 screwed into a bore 62 formed in the casting 6 and a pipe leading to the source of fuel supply is adapted to be connected with said nipple in any suitable way. The incoming fuel flows from the nipple 60 through a screen 64 received in the bore 62 and into a space 66 between the screen and the wall of said bore. A passage 68 communicates with the space 66 and at its lower end is slightly enlarged as indicated at 70. A nipple 72 having an axial passage 74 therethrough is screwed into the enlarged passage 70 and is provided with a valve controlled restriction 76 and ports 78 below such restriction which communicate with the float chamber 58. A valve 80 is held in position to close the passage 74 by the float mechanism when the fuel in the chamber is at a predetermined level so as to maintain said level substantially constant. The float mechanism comprises two floats 82 which are alike and are secured to a connecting sheet metal bar 84 from which projects a plate 86 positioned below valve 80 and having an upwardly bent tongue 88 which engages the valve. The plate 86 is pivoted on a pin 90 which is supported by two downwardly extending projections 92 of the casting 6. The plate 86 has an upwardly bent portion 93 which engages the nipple 72 to limit the downward movement of the floats and prevent the valve 80 from dropping out of the nipple if the float chamber became empty.

As shown in Fig. 6, a passage 94, shown in dotted lines and formed in the casting 6, connects with the top of the passage 68 and extends to a passage 96 at the opposite side of the carburetor, similar to the passage 68 and positioned above the float chamber 56. Flow of fuel from the passage 96 into chamber 56 is controlled by floats 82a and associated mechanism which is not shown. The floats 82a and the associated mechanism are of the same construction as floats 82 and the mechanism controlled thereby. Floats 82a are positioned in the chamber 56 as shown in Figs. 1 and 7 and control the flow of fuel thereto from the passage 96 in the same way as the floats 82 control flow from the passage 68 and through the nipple 72 into chamber 58.

There is a balancing passage 98 in the outer wall of the float chamber casting 4, as best shown in Fig. 10, which extends to both sides of the partition 38. Orifices 100 and 102 which are positioned approximately at the normal fuel level which is maintained by the floats, connect the chambers 56 and 58, respectively, with such passage, to permit movement of fuel from one chamber to the other upon any change of level in either chamber, as might occur upon tilting, for example.

It will be apparent also upon consideration of Fig. 10, that the space in which the fuel is maintained at a constant level by the mechanism described, namely, chambers 56 and 58, lies between an outer wall 104 and an inner wall 106 which surrounds the several mixture passages 28 and 30, and the various passages and wells which supply fuel thereto. It will also be clear that the two pairs of floats 82 and 82a are positioned in chambers 58 and 56, respectively, and are arranged approximately symmetrically with respect to the center of the carburetor.

Figure 14:
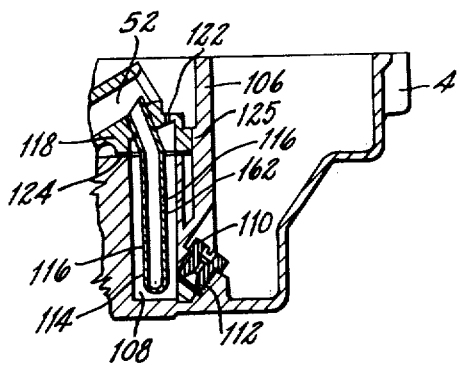
Figure 15:
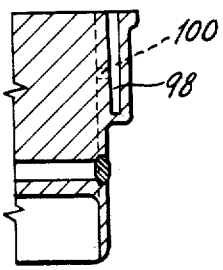
Figure 16:
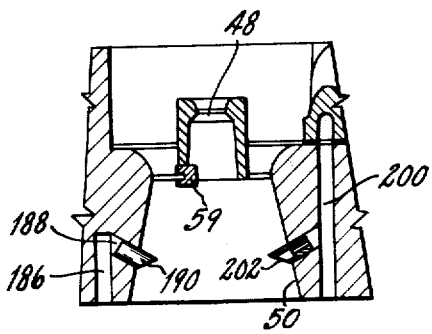

Fuel is supplied to the several passages 52 that communicate with the small venturi tubes 48 which comprise the main fuel inlets from four wells which are formed in the float chamber casting 4 closely adjacent to and inside the wall 106. These wells are the same in construction and one of such wells is indicated in Fig. 14 as 108. Fuel is supplied to the well from a fuel reservoir through a metering plug 110 which is screwed into a bore 112 formed in the casting. Extending downwardly into the well is a tube 114 which, at its upper end, connects with the passage 52 and is closed at the bottom end but is provided with a series of orifices 116 which are positioned along the length of the tube and are of whatever number and size as are found necessary to supply the proper amount of fuel to form a mixture of the proper fuel air ratio. The tube 52 and the small venturis 48 which supply fuel to both primary mixture passages 30 are formed in a single separate casting indicated by the number 118 which is held in place by suitable screws 120 and this casting closes the wells 108 at the top thereof, but is provided with small orifices 122, one of which is shown in Fig. 14, which serve as vents for the wells 108.

When the carburetor is in operation, fuel is drawn into the well through the metering plug 110 and through the orifices 116 into the tube 114 by which the fuel is introduced into the passages 52. Air can enter the orifices 122 and mix with the fuel in the tube 114 so that the tubes actually supply a mixture of fuel and air to the passages 52 when the carburetor is in operation.

When the engine has stopped after being in operation, if fuel vapor forms within the wells, or within the tubes 114, such vapor can escape through the orifices 122 or can rise within the tube 114 and escape in the passages 52 without forcing fuel out of the wells through the tubes into the carburetor. In this way the difficulties caused by percolation are largely avoided and moreover, since the tubes 114 are spaced from the well and have no metallic contact with anything other than the small casting 118 which is separated from the main casting section 6 by suitable gaskets as indicated at 124, except for a very small area of contact, as indicated at 125, the heating of the fuel by metallic conductivity is reduced to a minimum and there is but little vaporization of fuel within the tube 114. As already stated, there are four wells 108 and associated parts such as have been described and these are all alike, there being two wells which supply fuel to the primary mixture passages 30 and two which supply fuel to the secondary mixture passages 28.

Fuel is also supplied to the two wells 108 which are effective to supply fuel to the primary mixture passages 30 by supplemental or auxiliary passages 126, one of which is illustrated in Fig. 12. This passage is provided with a small metering plug 128 and extends from the well to a bore 130 in which is screwed a valve cage 132, the top of which is shown in Fig. 10 and which is shown in section in Fig. 12. Positioned within the valve cage 132 is a tapered valve 134 which is normally held in position to close an orifice 136 in the valve cage by means of a spring 138 which is received between a shoulder 140 on the valve and a member 142 which is positioned within the valve cage. When this valve is opened, it permits fuel to flow into the wells 108, which supply the mixture passages 30 with fuel in excess of the quantity of fuel which is supplied to such wells through the main metering orifices 110. The valve is opened to permit this excess flow of fuel when the engine is operating under heavy load and with open throttle, to provide the additional power which is required for such engine operation.

The operation of valve 134 is controlled by a rod 144 which, at its upper end, is connected to a hollow piston 146 which is slidable in a bore 148 in the casting 6, as best shown in Fig. 1 and received within this piston is a spring 150 which is effective to hold the piston in its lower position and to open the valve 134 when the engine is inoperative or the manifold vacuum is low. However, there is a passage 152 shown in Fig. 6 formed in a boss 153 which connects at one end with a passage 154 which extends downwardly through the castings 6, 4 and 2 to a groove 155 in the lower face of the casting section 2 as shown in Fig. 4 and connects with the outlets of both primary mixture passages 30 at points posterior to the primary throttles so that the vacuum which is thus maintained is communicated to the cylinder 148 above the piston 146.

When the engine is operating at relatively low speeds and with the throttles only partially open, the vacuum is effective to hold the piston 146 and the rod 144 in its upper position so that the valve 134 is permitted to close and no fuel is permitted to flow through the passage 126 into the fuel feeding well 108. When the throttles are opened wide for the purpose of obtaining high speed or to ascend a grade, the vacuum posterior to the primary throttles drops off and becomes insufficient to overcome the effect of spring 150 so that such spring will then move the piston and rod 144 downwardly to open the valve 134 and allow additional fuel to enter the well through the passage 126.

There are two passages 126, in each of which is a metering plug 128, which extend from the bore 130 to each of the two fuel feeding wells 108 which supply the primary mixture passages 30, and flow through both of these passages is controlled by the operation of a single piston 146. As illustrated, there is no means for supply additional fuel to the wells which supply fuel to the secondary mixture passages 28, but it will be understood that passages like passages 126 can be provided and a secondary piston similar to the piston 146 can be utilized for controlling such passages in the same way as the piston 146 controls the passages 126 which supply fuel to those wells 108 from which fuel is conveyed to the primary mixture passages 30. If such mechanism were provided the power obtained when the secondary mixture passages are effective and the secondary throttles are opened wide, would be somewhat greater than when such piston and fuel passages controlled thereby are not provided.

As shown in Fig. 1, there is a passage 156 which connects the space within the air intake with the bore 146 to permit the passage of air to said bore. This passage serves as a vent to prevent any possibility of the high manifold vacuum being communicated to the space below the bottom part of piston 146.

In addition to the means for supplying fuel to the main inlets, fuel must also be supplied to the carburetor for idling and in the device disclosed herein fuel for idling is supplied only to the two primary mixture passages 30, there being no fuel supplied for idling to the mixture passages 28, for the reason that such mixture passages do not function at all until the engine is operating at far above idling speed and the primary throttles are opened to substantially 40°, the secondary throttles being held locked in closed position to render the secondary mixture passages completely ineffective until the primary throttles are opened to that extent.

For supplying idling fuel there are four idling wells which are exactly alike in construction and passages lead from two of these idling wells to each of the primary mixture passages, as will be hereinafter set forth.

Figure 17:
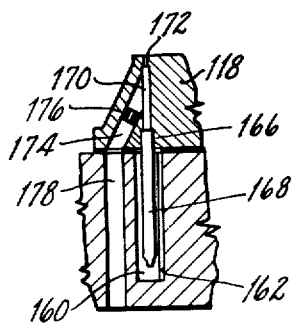

As shown in the diagrammatic view, Fig. 1, the passages which supply idling fuel to one of the primary mixture passages are shown as receiving fuel from two idling wells 160 each of which receives fuel from one of the main wells 108 through a slot 162. The two wells 108 and 160 are positioned close together, being separated by a relatively thin portion of the casting which forms a wall through which the slot 162 is cut. As shown in Fig. 1 such slots are shorter than the depth of the well 160 but they may be of any desired length and preferably are of a length equal to the depth of the well to facilitate manufacture. One of the wells 160 and a part of the slot 162 are shown in Fig. 17 and it will be noted that in this figure, which shows the preferred construction, the slot is as long as the well is deep.

Extending downwardly from and fitting tightly in a bore 166 in the casting 118 is a tube 168 which is spaced from the walls of the well 160 and terminates near the bottom thereof. This tube has a small orifice in its lower end to receive fuel from the well and a passage 170 of somewhat smaller size than the bore 166 extends upwardly in the casting 118 and communicates with a restricted vent orifice 172 which opens into the secondary air inlet passage 42. A passage 174 in the casting 118 communicates with the passage 170 and is provided with a metering plug 176. This passage 174 connects with a vertical passage 178 formed in the float chamber casting 4. Each of the passages 178 which are associated with the secondary idling wells connects with a surface groove or channel formed in the bottom of casting 4 and extending to a vertical passage 182 formed in the casting 2 as shown in Fig. 1, which connects at its lower end with a small passage 184 that communicates with one of the primary mixture passages 30 at a point immediately posterior to the throttle valve in such passage. The passage 182 also connects at its upper end with a vertical passage 186 in casting 4 which communicates with a bore 188 in which is positioned a short tube 190, the end of which is cut off at an angle, as indicated in Fig. 1, and communicates with the mixture passage 30 near the outlet of the main venturi tube which forms the wall of such passage. There is another secondary idle fuel well and passages leading therefrom to the other primary mixture passage 30 of exactly the same construction as that described.

By positioning the tube 190 with the angled end thereof arranged as shown in Fig. 1, the partial vacuum or suction maintained at the end of said tube is somewhat more than it would have been if the end of the tube was normal to its axis or if the position of the tube was the reverse of that shown.

In addition, there are two primary idle fuel wells of exactly the same construction as above described, but which deliver fuel to the primary mixture passages through a somewhat different arrangement of passages. Each of these wells has associated therewith passages similar to passages 174 and 178 and each of them is provided with a metering plug similar to 176 but the passage 178 in casting 4 connects directly with a very short groove 179 in the bottom face of casting 4, and such groove also connects with a passage 192 which is formed in the outer wall of the primary mixture passage 30 diametrically opposite the passage 182. The passage 192 is connected with the primary mixture passage 30 by three smaller passages 194, 196 and 198 as shown in Fig. 1. The passages 194 and 196 are located immediately anterior to the edge of the throttle valve in the primary mixture passage 30 when such valve is in closed position while the passage 198 is located posterior to such valve when the valve is closed. The passage 192, at its upper end, connects with a passage 200 similar to the passage 186 and a tube 202 establishes communication between the passage 200 and the primary mixture passage 30 just as does the tube 190, previously described, and is of similar construction.

The passage 198 is controlled by a manually adjustable valve 204 which is provided with a spring 206 to hold it in any desired position of adjustment and it can be varied to change the effective size of the passage 198 through which idling mixture is conveyed to the mixture passage 30. This arrangement of passages and orifices is duplicated with respect to the other primary mixture passage 30 which is not shown in Fig. 1.

The idle fuel supply passages are so arranged with respect to the throttle and so calibrated that they will provide a mixture of proper ratio and quantity during all idling and part throttle operation. If the idling passage from the secondary fuel chamber 58 were not so positioned that it became anterior to the throttle during the very early opening movement of such throttle, the mixture would become too rich but with the arrangement shown, this difficulty is avoided and if the supply passages are properly calibrated, a mixture of the desired ratio is provided throughout the entire part throttle range as well as during idling operation.

A mixture of the desired proportions could be obtained if fuel for idling and for part throttle operation before opening of the secondary throttles was provided only by the primary fuel system, but it is desirable to take some fuel from the chamber 58 during this operation to prevent the vaporization of the lighter components of the fuel in the chamber 58, leaving the heavier components in such chamber when the secondary mixture passages become effective. By taking fuel from both chambers 56 and 58 during idling and part throttle operation, the character of fuel in the two chambers is the same when the secondary mixture passages become effective.

As already stated, the primary throttles are operated by a manually operated arm 36 which is secured to the end of the common throttle shaft 32 and this arm is utilized to operate an accelerator pump. To effect operation of the pump the link 210 is pivotally connected to the arm 36 and is also pivotally connected to one end of a lever arm 212 which is secured to a short stub shaft 214 rotatably mounted in any suitable way in a supporting bracket 216 that extends upwardly from the flat part of the casting 6 which serves as a cover for the float chambers as indicated in Fig. 3. Secured to the opposite end of the shaft 214 is a lever arm 218 which is pivotally connected at its end to the horizontally extending end 220 of a piston rod 222 which operates the pump piston.

Figure 13:
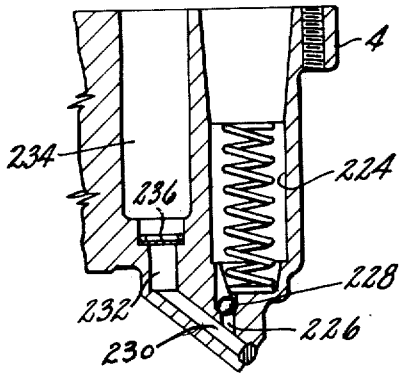

The construction of the pump is best shown in the diagrammatic view, Fig. 1 and Fig. 13. The pump includes a cylinder 224 formed in the casting section 4 and in which the pump piston slides. This cylinder is connected at its lower end by a short passage 226, which is controlled by a check valve 228, with a passage 230 arranged at an angle in the casting section 4 and which connects with the vertical passage 232. The latter, at its upper end, connects with a chamber 234 which has an opening, not shown, connecting with fuel chamber 56 below the level of fuel therein. Fuel flows through such opening into chamber and then through a screen 236 into the passage 232 and thence through the passages already described into the pump cylinder at the bottom thereof. The upper part of cylinder 224 is connected with fuel chamber 56 by a slot 237 which permits escape of any fuel vapor.

The pump includes a piston 238 which is connected to the lower end of the piston rod and has a flexible cup 240 retained by a washer 242 received between the cup and a flange 244 extending from a sleeve 246 which extends upwardly from the piston. A coil spring 248 is positioned between the flexible cup and the piston and holds the flexible cup in close engagement with the wall of the cylinder 224. A spring 250 is received between the piston and the lower end of the cylinder 224 and normally urges the piston upward. The piston rod is enlarged at the lower end as indicated at 252 and this enlargement slides within the sleeve 246, a pin 254 which extends through such enlargement being received in slots 256 and effecting a result later described. A spring 258 is positioned between the flange 244 on the piston and a washer 260 which is carried by the piston rod and is fixed relative to said rod so that as the piston rod is depressed, the spring 258 is compressed and overcomes the force of spring 250 which normally resists downward movement of the piston. Therefore, the piston is ordinarily moved downwardly with a somewhat delayed action by the compression of the spring 258, and is effective to force fuel out of the pump cylinder through a delivery passage, which will be later described, and into the primary mixture passages 30 as long as the piston is moved by said spring.

If the piston rod is moved downwardly very rapidly the pin 254 can engage the lower end of the slots 256 and move the pump piston positively downward until the movement of the actuating lever for the piston rod stops. This will cause an immediate discharge of fuel by the pump piston which will be followed by a further discharge of fuel as the spring 258 expands, until the forces of the springs 258 and 250 are balanced and movement of the piston stops. By means of this mechanism an immediate discharge of fuel followed by a somewhat protracted delayed discharge of fuel is brought about if the primary throttles are opened wide and very rapidly.

The discharge passage from the pump is best shown in Fig. 11, in which a delivery passage 262 connects with the cylinder 224 at the lower end thereof, but above the check valve 228 and extends to a vertical passage 264 formed in the casting section 4, which has an enlarged portion 266 at its upper end in which there is received a tapered control valve 268 which is normally seated and forced upwardly by the fuel which is forced out of the pump cylinder. This valve is designed to prevent fuel being drawn from the pump cylinder by suction when the pump piston is not moved. The bore 266 connects, at its upper end, with a channel 270 formed in the bottom of the casting 118 and this channel connects with a vertical passage 272 which, in turn, connects with a delivery passage 274 which delivers fuel into the intake passage 30 just anterior to the main venturi 50 and at a point relatively close to the wall surfaces of the venturi, the passage 274 being very short and not projecting into the interior of said venturi. A plug 276 is positioned in a bore located immediately above the passage 272 and has a small passage 278 formed therein. The passage 272 extends upwardly to chamber 279 of larger diameter than the passage and in which a check-valve 281 is retained by a retaining clip 282 positioned in a groove 285. When the pump is operated this valve is lifted to close the passage 278 but normally is in the position shown in Fig. 26, in which the passage 278 serves as a vent to prevent fuel from being drawn into the carburetor by the suction in the mixture passage.

There is no pump mechanism for supplying fuel upon acceleration to the secondary mixture passages in the device which is illustrated herein and there is only one pump piston and cylinder, but the channel 270 is so formed that it conducts fuel to two passages 274 which are just alike and one of which delivers fuel to one of the primary mixture passages 30 while the other delivers fuel to the second primary mixture passage. A pump could be provided to pump fuel into the secondary mixture passages for acceleration purposes after the secondary throttles start to open, but it has been found that with a pump of proper capacity supplying the primary passages, a pump for the secondary passages is not required.

As shown in Fig. 1, each of chambers 56 and 58 is provided with a vent passage, the chamber 56 having a passage 280 which is formed in the casting 6 and communicates with the space in the chamber 56 above the level of the fuel therein. A tube 282, the end of which terminates in a plane normal to the axis of the mixture passage extends into the passage 280 and communicates with the air intake 40 anterior to the choke valve as shown in Fig. 1. A passage 284 very similar to the passage 280 communicates with the chamber 58 at a point above the level of fuel therein and a tube 286 similar to the tube 282 is positioned in the passage 284 and extends into the intake which supplies air to the secondary mixing chambers. The passages 287 shown in Fig. 7 connect with passages 280 and 284 through openings 289 in tubes 282 and 286 and constitute auxiliary vents, which are designed to provide sufficient venting area and to equalize pressures in the fuel chambers which might be brought about by air currents created by the air cleaner (not shown) through which air entering the carburetor passes.

The tubes 282 and 286 and passages 287 normally effect venting of the fuel chambers, but there is an additional vent for the chamber 56 which is best shown in Figs. 9 and 9a. The bracket 216, on which the pump operating lever is mounted, has a space inside of the bracket which is indicated at 288 and such space is in communication with the space above the fuel in the primary fuel chamber 56. Positioned in this space and supported in an opening in the wall of the bracket 216 is a cylindrical element 290 having a closed end 292 which fits tightly in the opening above referred to and in which is slidably mounted a cylindrical valve member 294 slidable within the cylindrical element 290 and provided with a solid head 296 somewhat larger than the cylinder and of sufficient magnitude to close a port 298 which is open to the atmosphere when the valve is in closed position. The valve is held closed by spring 300 which is positioned between the end 292 of the sleeve 290 and the valve head 296 and is effective at all times when the engine is in operation except when the throttle is almost closed. When the throttle is in almost closed position, as when the engine is idling or is not running, the lever 212 which operates the pump piston is in the position shown in Fig. 3 and when in this position a toe 302 which projects from an offset part 304 of the lever 212 engages the valve head 296, moving the latter against the force of spring 300 to open the port 298. The port is therefore open when the engine is inoperative to permit escape of any vapor forming in the primary fuel chamber to the outside air. When the pump is operated, on opening of the primary throttles, to pump fuel into the primary mixture passages, the lever 212 moves counterclockwise and the toe is moved away from the valve so that it is closed by spring 300 at some predetermined point in the opening movement of the primary throttles. This closing of the vent port 298 is effective when the throttle has made only a very small opening movement.

In the device as shown the arrangement of the mechanism through which the primary throttles operate the secondary throttles is such that when the latter are unlocked and can be moved, the primary throttles make 40 degrees of opening movement before the secondary throttles begin to open and if the latter are locked the primary throttles can go to their fully open position while the secondary throttles remain closed. To effect this operation there is movably mounted on the primary throttle shaft, at the end opposite the actuating lever 36, an arm or plate 310 which operates an arm 312 on the end of the secondary throttle shaft 34 to open the secondary throttles after 40 degrees of movement of the shaft 32.

To this end, the plate 310 is moved through the medium of a spring 314 which surrounds the shaft 32 and has one end anchored to a pin 316 screwed into said shaft and the other end 318 of this spring engages the lower side of a cross member 320 integral with and positioned between the plate 310 and a part 322, parallel to the plate and also movably mounted on the shaft 32 as shown in Figs. 4 and 25. As the primary throttle is opened, the shaft 32 is moved counterclockwise, as seen in Fig. 2, and the end 318 of the spring 314 exerts a pressure on the cross member 320 tending to move the plate 310 counterclockwise.

The plate 310 has a slot 324 therein in which is received a pin 326 which projects from a link 328 and is retained in engagement with the slot by any suitable means, for example, by a washer 330 held in place by a cotter pin. A bent over part 332 of the link 328 at its opposite end extends through an opening 334 in the arm 312, which is properly positioned to effect the desired movement of the secondary throttles. There may be a series of these openings 334 at different positions, if desired, so that the extent of opening of the primary throttles before movement of the secondary may be changed, if desired. The arm 312 is secured to the secondary throttle shaft 34 and the latter is normally held in position to close the secondary throttles by a spring 336, one end of which is connected to arm 312 and the other end in an opening in the casting section 4, as shown in Fig. 2. The arm 312 fits on a flattened portion 338 of shaft 34, as shown in dotted lines in Fig. 2 and is held in position thereon by screw 340 threaded in the end of the shaft and engaging a washer 341. A lug 342 projects laterally from the arm 312 above a toe 344 on the arm 310 for a purpose explained later.

As already stated, upon any opening movement of the primary throttles, the spring 314 tends to rotate the plate 310 counterclockwise. If the arm 312 is not held against movement by means later described, the plate 310 will move until the right end of the slot engages the pin 326 before any movement of arm 312 takes place and this engagement occurs after 40 degrees of primary throttle movement. After such engagement continued movement of plate 310, as the primary throttles move on to open position, effects movement of the arm 312 in a clockwise direction to open the secondary throttles, the geometry of the operating mechanism being such that a movement of the primary throttles from 40 degrees to full open position will effect a complete opening of the secondary throttles from fully closed to fully open position. If the secondary throttles are held locked in closed position when the primary throttles are opened, the plate 310 is moved until the right end of slot 324 engages pin 326 and the movement of the plate stops, but opening of the primary throttles can continue because the spring 314 yields, allowing shaft 32 to continue to move and the spring pressure on the part 320 merely increases. If, then, the secondary throttles are released for movement, the force of the spring 314 will effect movement of the secondary throttles to whatever position is determined by the position of the primary throttles, at the time such release takes place.

When the primary throttle shaft is returned to normal closed position, the pin 316 on shaft 32 engages the cross member 320 to restore the plate 310 to its initial position. As the plate 310 is thus restored, the spring 336 moves the arm 312 back toward its initial position and if for any reason such spring fails to move the secondary throttles to the fully closed position, the toe 344 will engage the lug 342 on arm 312 and positively move the arm 312 to the closed throttle position.

As already stated, there is no choking of the secondary mixture passages and, therefore, it is desirable to prevent opening of the secondary throttles at low temperature so as to insure the formation of a rich enough mixture for proper operation at low temperatures. Since the single choke valve 44 is automatically controlled in response to temperature variations, such choke valve is utilized to prevent opening of the secondary throttles until a predetermined temperature is reached.

It is also desirable to effect faster idling of the engine at low temperatures than at normal temperatures for reasons well known, as for instance, to prevent possible stalling. The choke valve operates a fast idle cam to control the idle position of the primary throttles only and this cam is utilized to control the locking device for the secondary throttles.

Referring to Fig. 3, the choke valve shaft 46 has secured thereto in any desirable way a collar 346 which has a lug 348 extending axially of the shaft and overlying a toe 350 formed on one end of a short lever arm 352 rotatably mounted on the shaft 46 and connected at its other end to a link 354, the upper end of which is bent over and pivotally engages an orifice in the arm 352. At its lower end, the link 354 is bent over and engages a suitable orifice in a fast idle cam 356 which is pivoted on a pin 357 screwed into a boss 359 formed on the casting, or in any other suitable way, and has a cam surface 358 that is engaged by a stop screw 360 which is threaded in a laterally projecting flange 362 of actuating lever 36 and held in any adjusted position by a retaining spring 363. The cam is moved to different positions by the choke valve shaft 46 as the temperature changes and the surface 358 opens the primary throttles to different extents from the fully closed position so as to variably regulate idling speeds inversely with respect to the temperature. The cam surface may be a continuous curve as shown or may comprise a series of stops at progressively greater distances from the point at which the cam is pivoted. Both forms of cam are old and well-known.

When normal temperature is reached and the choke valve is open, the cam 356 is moved to such a position that it no longer controls the idling position of the primary throttles, such position being then controlled by engagement of the laterally projecting flange 364 on lever 36 with an adjustable stop screw 366 threaded in a boss 368 projecting from the casting 2, and held in any set position by spring 369.

To enable the fast idle cam to control the locking of the secondary throttle shaft 34 the cam is provided with a surface 370, which at low temperatures is engaged by a lug 372 that projects laterally from a dog 374 that is suitably mounted on the flattened end 376 of the secondary throttle shaft 34. The surface 370 is at such an angle relative to the lug and the pivot of the cam that the pressure of spring 314 to open the secondary throttles has little if any tendency to rotate the cam 356, and although the cam is held in the solid line position of Fig. 3 only by the force of the thermostat, the cam serves as a substantially positive lock for the shaft 34 at low temperatures. As the temperature increases, the cam is moved counterclockwise and at some predetermined temperature reaches the position shown in dotted lines in Fig. 3. When this position is reached, the surface 370 moves out of engagement with the lug 372 permitting the lug to move over the surface 378 on rotation of shaft 34, enabling the secondary throttles to be opened to a position determined by the position of the primary throttles.

The dog 374 has a second projecting lug 375 formed thereon, as shown in Figs. 3 and 4 which is adapted to engage stop surfaces 377 formed on the boss 359 when the secondary throttles reach full open position and prevents further throttle movement. A lug 379 extends outwardly from cam 356 and the surface 381 of the throttle actuating lever 36 will engage this lug and slightly open the choke valve to effect de-choking in case of flooding.

The automatic control of the choke valve is of conventional construction and forms no part of the present invention. The valve is subject to the effect of three forces which determine its position. First, as clearly shown in Fig. 1, the shaft 46 is off-center with respect to the valve so that the force of the entering air, which creates a pressure differential across the valve tends to open it and this force is increased as the primary throttles are opened, and the volume and velocity of air flow are increased. In addition, the position of valve 44 is controlled by the force of a thermostat and the force exerted by a piston which is subject to variations in the suction or partial vacuum maintained posterior to the throttle, this mechanism being best shown in Figs. 20, 21 and 22.

The choke valve shaft 46 projects into a small housing 380, secured in any suitable way to the casting 6 and having an adjustable cover plate 382 secured in any adjusted position by screws 384, or other suitable means. Secured to the flattened end 386 of shaft 46 is an operating lever which at one end has an arm 390 projecting therefrom, which is engaged by a hook 392 on the end of a bimetallic coiled thermostat 394, the other end of which is secured to a stud extending into the housing 380 from the plate 382 and parallel to the axis of shaft 46. By rotating the plate 382 on the housing, the force exerted by the thermostat initially on the arm 388 at any given temperature can be variably adjusted. This thermostat tends to hold the choke valve closed with a force that varies inversely as the temperature and when the temperature gets high enough, for example normal engine operating temperature, the hook 392 moves away from the arm 390 and the thermostat exerts no force whatever, tending to hold the choke valve closed.

At the opposite end of arm 388, it is pivotally connected to a piston rod 400 pivotally connected to a piston 402 slidable in a cylinder 404 to which the partial vacuum of the intake posterior to the primary throttles is communicated. The cylinder may be connected with the intake at any suitable point posterior to such throttles by passages formed in the walls of the castings, or by an outside conduit and the device disclosed is designed for an outside conduit. For this purpose, cylinder 404 has a boss 406 formed thereon which has a passage 408 therein connecting with the cylinder and is threaded to permit attachment of a pipe leading to some suitable point posterior to the primary throttles. The cylinder 404 has two passages 410 formed in the wall thereof which are blocked by the piston 402 when the choke valve is closed, but which are opened after the valve has opened to a certain extent, to effect communication between the cylinder and the housing 380, and to reduce the force of suction which is effective on the piston after the valve 44 has been opened to a predetermined extent. This arrangement prevents sufficient opening of the valve after the engine is operating under its own power to form too lean a mixture for proper operation.

The cover plate has a threaded boss 412 formed thereon to which a conduit leading to a conventional manifold stove may be connected to supply heated air to the thermostat housing 380. A passage 414 extends through the boss and connects with a space 416 between the inner face of the cover plate and a baffle 418 mounted at the base of the stud 398 as shown in Fig. 20. An annular opening 420 connects the space 416 with the interior of the housing 380 where the thermostat is positioned. When the engine starts to run, the piston 402 is moved to a position to unblock the passages 410 so that engine suction is communicated to the interior of housing 380 and is effective to draw heated air through the housing so as to heat up the thermostat as the engine temperature increases. The valve 44 is always moved to a position, when the engine is operating, at which the force of the thermostat tending to close the valve is balanced by the force of suction on the piston 402 and the pressure differential across the valve, itself, created by the flow of incoming air.

As shown in Fig. 22, the arm 390 extends through a slot 422 formed in a plate 424 which is mounted in the housing 380 and divides the space therein into two chambers in one of which the thermostat is positioned and in the other of which the suction operated piston and associated cylinder are located. The purpose of this plate is to prevent, as far as possible, the admission of dirt to the space where the piston is, so that as hot air is drawn through the housing, the danger of dirt fouling the piston is minimized.

In the throttle body casting 4 there is formed in the wall a chamber 426 of the shape shown in Fig. 4, which extends upwardly in the wall to a point above the idle adjustment valves 204 and partly surrounds the primary mixture passages 30. When the carburetor is assembled on the manifold, this chamber is designed to register with a passage in the manifold through which exhaust gas is passed so that such exhaust gas enters the chamber 426 and heats the wall of the primary mixture passages adjacent one edge of the primary throttle valve and the idle mixture supply ports which connect passages 192 with the primary mixture passages. By heating the wall of passages 30 in this way objectionable icing at the idle ports and the edge of the throttles 30 is avoided. It should be noted that the heating chamber is associated only with the primary mixture passages because there is no introduction of fuel for idling in the secondary passages 28 and icing does not occur in such passages at any time, but obviously the passage could extend around the passages 28 also.

While the embodiment of the present invention as herein disclosed constitutes a preferred form, it is to be understood that other forms might be adopted.

What is claimed is as follows:

1. A charge forming device for internal combustion engines having in combination primary and secondary mixture passages both of which are adapted to supply combustible mixture to the intake manifold of said engine, means for supplying fuel and air to each of said mixture passages, primary and secondary throttle valves controlling the quantity of combustible mixture supplied by said primary and secondary carburetors respectively, mechanism for operating said primary and secondary throttles concurrently, and means for supplying fuel for idling to the primary mixture passage only, said last named means comprising fuel supply passages for introducing fuel into the primary mixture passage for idling, said fuel supply passages being located on opposite sides of the primary mixture passage, a single fuel inlet connecting one of said fuel supply passages with the mixture passage, a plurality of fuel inlets connecting the other of said fuel passages with the mixture passage, all of said fuel inlets being closely adjacent the primary throttle valve when said valve is in closed position and a plurality of idling fuel wells, each of which supplies fuel to one of the idling fuel supply passages.

2. A charge forming device for internal combustion engines having in combination primary and secondary mixture passages both of which are adapted to supply combustible mixture to the intake manifold of said engine, means for supplying fuel and air to each of said mixture passages, primary and secondary throttle valves controlling the quantity of combustible mixture supplied by said primary and secondary carburetors respectively, mechanism for operating said primary and secondary throttles concurrently, and means for supplying fuel for idling to the primary mixture passage only, said last named means comprising fuel supply passages for introducing fuel into the primary mixture passage, said fuel supply passages being located on opposite sides of said mixture passage, a single fuel inlet connecting one of said fuel supply passages with the mixture passage posterior to the throttle valve when the latter is in closed position, and a plurality of fuel inlets connecting the other of said fuel supply passages with the mixture passage, at least one of which is posterior to the throttle valve when said valve is in closed position.

3. A charge forming device for internal combustion engines having in combination primary and secondary mixture passages both of which are adapted to supply combustible mixture to the intake manifold of said engine, means for supplying fuel and air to each of said mixture passages, primary and secondary throttle valves controlling the quantity of combustible mixture supplied by said primary and secondary carburetors respectively, mechanism for operating said primary and secondary throttles concurrently, means for supplying fuel for idling to the primary mixture passage only which includes fuel supply passages for introducing fuel into the primary mixture passage, said fuel supply passages being located on opposite sides of said mixture passage, a single fuel inlet connecting one of said fuel supply passages to the mixture passage posterior to the throttle when the latter is closed and a plurality of fuel inlets connecting the other of said fuel supply passages with the mixture passage, said last named fuel inlets being located both posterior and anterior to the throttle when the latter is closed.

4. A charge forming device for internal combustion engines having in combination primary and secondary mixture passages both of which are adapted to supply combustible mixture to the intake manifold of said engine, means for supplying fuel and air to each of said mixture passages, primary and secondary throttle valves controlling the quantity of combustible mixture supplied by said primary and secondary carburetors respectively, mechanism for operating said primary and secondary throttles concurrently, means for supplying fuel for idling to the primary mixture passage only which includes fuel supply passages connecting with the primary mixture passages at points on opposite sides of said passages posterior to the throttle valve and so positioned with respect thereto that one of said passages becomes anterior thereto during the initial opening movement of the throttle while the other passage is posterior to the throttle during all of the opening movement of said throttle, a single vent passage connecting one of said fuel supply passages with the primary mixture passage, and a plurality of vent passages located at different distances from the throttle for connecting the other of said idling fuel supply passages with the primary mixture passage.

5. A charge forming device for internal combustion engines having in combination primary and secondary mixture passages, both of which are adapted to supply combustible mixture to the intake manifold of said engine, means for supplying fuel and air to each of said mixture passages, primary and secondary throttle valves controlling the quantity of combustible mixture supplied by said primary and secondary carburetors respectively, mechanism for operating said primary and secondary throttle valves concurrently, a primary fuel chamber from which fuel is conveyed to the primary mixture passage and a secondary fuel chamber from which fuel is conveyed to the secondary mixture passage, a primary idling fuel supply passage receiving fuel from the primary fuel chamber and connected with the primary mixture passage relatively close to the primary throttle valve, and a secondary idling fuel supply passage receiving fuel from the secondary fuel chamber and also connected with the primary mixture passage at a point relatively close to the primary throttle.

6. A charge forming device for internal combustion engines having in combination primary and secondary mixture passages both of which are adapted to supply combustible mixture to the intake manifold of said engine, said primary passage including a main venturi, means for supplying fuel and air to each of said mixture passages, primary and secondary throttle valves controlling the quantity of combustible mixture supplied by said primary and secondary carburetors respectively, mechanism for operating said primary and secondary throttles concurrently, and means for supplying fuel for idling to the primary mixture passage only, said last named means comprising a plurality of idling fuel supply passages for delivering fuel for idling to the primary mixture passage relatively close to the primary throttle, said fuel supply passages being located on opposite sides of the mixture passage, a vent tube connecting each of said idling fuel supply passages with the primary mixture passage anterior to the primary throttle and projecting into the venturi of said primary mixture passage, the outlets of said tubes being so arranged with respect to the direction of flow through said passage that a subatmospheric pressure is created at said outlets by the flow of mixture through said mixture passage.

7. A charge forming device for internal combustion engines having in combination primary and secondary mixture passages, both of which are adapted to supply combustible mixture to the intake manifold of said engine, means for supplying fuel and air to each of said mixture passages, primary and secondary throttle valves controlling the quantity of combustible mixture supplied by said primary and secondary carburetors respectively, mechanism for operating said primary and secondary throttle valves concurrently, a primary fuel chamber from which fuel is conveyed to the primary mixture passage and a secondary fuel chamber from which fuel is conveyed to the secondary mixture passage, a primary idling fuel supply passage receiving fuel from the primary fuel chamber and connected with the primary mixture passage relatively close to the primary throttle valve, and a secondary idling fuel supply passage receiving fuel from the secondary fuel chamber and also connected with the primary mixture passage at a point so positioned with respect to the throttle valve that said point becomes anterior to the throttle valve in the beginning of the opening movement of the throttle and the flow of fuel therefrom is greatly reduced.

8. A charge forming device for internal combustion engines comprising in combination, a mixture passage adapted to supply combustible mixture to the engine intake, a constant level fuel supply chamber, a main fuel inlet for supplying fuel to said mixture passage, a main fuel well substantially closed at its upper end and receiving fuel from said fuel supply chamber, a fuel supply tube of substantially constant diameter extending downwardly into said well and delivering fuel to said fuel inlet, said fuel supply tube being supported at its upper end by a member forming a cover for the well and having formed therein a passage leading to said fuel inlet, said fuel supply tube separated from the wall of the well throughout its length so that said tube is entirely surrounded by fuel in the well and has no metallic contact with a part of said charge forming device except at its upper end, said fuel supply tube being also closed at its lower end and provided with a series of orifices throughout its length to permit flow of fuel or fuel vapor from the well into said tube, and a vent passage formed in the closed upper end of the well to permit escape of fuel vapor from the well.

9. A charge forming device for internal combustion engines comprising in combination, a mixture passage adapted to supply combustible mixture to the engine intake, a constant level fuel supply chamber, a main fuel inlet for supplying fuel to said mixture passage, a main fuel well substantially closed at its upper end and receiving fuel from said fuel supply chamber, a fuel supply tube of substantially constant diameter extending downwardly into said well and delivering fuel to said fuel inlet, said fuel supply tube being supported at its upper end by a member having formed therein a passage leading to said fuel inlet said fuel supply tube separated from the wall of the well throughout its length so that said tube is entirely surrounded by fuel in the well and has no metallic contact with a part of said charge forming device except at its upper end, said fuel supply tube being also closed at its lower end and provided with a series of orifices throughout its length to permit flow of fuel or fuel vapor from the well into said tube, an idling fuel well receiving fuel from said main fuel well and also having communication therewith at a point above the fuel in said wells, and a vent passage formed in the closed upper end of the main well for permitting escape of fuel vapor from both said wells.

10. A charge forming device for internal combustion engines comprising in combination primary and secondary mixture passages adapted to supply combustible mixture to the engine intake, primary and secondary throttle valves controlling the flow of fuel mixture therefrom, primary and secondary fuel chambers associated with said mixture passages, a main fuel inlet supplying fuel to each of said mixture passages, a plurality of main fuel wells with which said fuel inlets communicate, a plurality of idling fuel wells one of which communicates with each of said main wells, and a plurality of idling fuel supply passages one of which connects with each of said idling fuel wells and both of which supply idling fuel to the primary mixture passage.

11. A charge forming device for internal combustion engines comprising in combination primary and secondary mixture passages adapted to supply combustible mixture to the engine intake, primary and secondary throttle valves controlling the flow of fuel mixture therefrom, primary and secondary fuel chambers associated with said mixture passages, a main fuel inlet supplying fuel to each of said mixture passages, primary and secondary air inlets for supplying air to said primary and secondary mixture passages, a plurality of vent passages for admitting air to each of said fuel chambers, one of said vent passages communicating with the air inlet and the other of said vent passages being positioned outside the air inlet, and another vent passage connected with the primary fuel chamber, said vent being normally ineffective during engine operation, and means rendering said vent effective when the throttle is in idling position.

12. A charge forming device for internal combustion engines comprising in combination primary and secondary mixture passages adapted to supply combustible mixture to the engine intake, primary and secondary throttle valves controlling the flow of fuel mixture therefrom, primary and secondary fuel chambers associated with said mixture passages, a main fuel inlet supplying fuel to each of said mixture passages, primary and secondary air inlets for supplying air to said primary and secondary mixture passages, venting means for admitting air to each of said fuel chambers, an additional vent connecting the primary fuel chamber with the atmosphere which is normally ineffective during engine operation, a valve for rendering said additional vent effective, and means for opening said valve when the primary throttle is in closed position.

13. A charge forming device for internal combustion engines comprising in combination primary and secondary mixture passages adapted to supply combustible mixture to the engine intake, primary and secondary throttle valves controlling the flow of fuel mixture therefrom, primary and secondary fuel chambers associated with said mixture passages, a main fuel inlet supplying fuel to each of said mixture passages, primary and secondary air inlets for supplying air to said primary and secondary mixture passages, venting means for admitting air to each of said fuel chambers, an additional vent connecting the primary fuel chamber with the atmosphere which is normally ineffective during engine operation, a valve for rendering said vent effective, an accelerator pump operable to supply additional fuel on acceleration, means actuated by the primary throttle for operating said pump, and means operable by the pump operating means for opening said valve.

14. A charge forming device for internal combustion engines comprising in combination primary and secondary mixture passages adapted to supply combustible mixture to the engine intake, primary and secondary throttle valves controlling the flow of fuel mixture therefrom, primary and secondary fuel chambers associated with said mixture passages, a plurality of main fuel inlets one of which supplies fuel to the primary mixture passage and the other to the secondary mixture passage, a fuel passage leading from one of said inlets to the primary fuel chamber, a second fuel passage leading from the other of said inlets to the secondary fuel chamber, a passage for connecting the primary and secondary fuel chambers and orifices positioned substantially at the normal fuel level for connecting said passage with each of said fuel chambers.

15. A charge forming device for internal combustion engines having in combination primary and secondary mixture passages both of which are adapted to supply combustible mixture to the intake manifold of said engine, means for supplying fuel and air to each of said mixture passages, primary and secondary throttle valves controlling the quantity of combustible mixture supplied by said primary and secondary carburetors respectively, mechanism for operating said primary and secondary throttles concurrently, means for supplying fuel for idling to the primary mixture passage only which includes fuel supply passages for introducing fuel into the primary mixture passage, said fuel supply passages being located on opposite sides of said mixture passage, a single fuel inlet connecting one of said fuel supply passages to the mixture passage posterior to the throttle when the latter is closed, a plurality of fuel inlets connecting the other of said fuel supply passages with the mixture passage, said last named fuel inlets being located both posterior and anterior to the throttle when the latter is closed, and a valve associated with one of said plurality of inlets for variably controlling the rate of fuel flow therethrough.

16. A charge forming device for internal combustion engines having in combination primary and secondary mixture passages, both of which are adapted to supply combustible mixture to the intake manifold of said engine, means for supplying fuel and air to each of said mixture passages, primary and secondary throttle valves controlling the quantity of combustible mixture supplied by said primary and secondary carburetors respectively, a single operating mechanism for actuating both of said throttle valves sequentially and including means permitting said primary throttle valve to be opened while said secondary throttle valve is held in closed position, a choke valve movable to different positions for controlling admission of air to the mixture, a member movable by the choke valve to limit the closing movement of the primary throttle so as to variably control the engine idling speed, and means controlled by said member for preventing opening of the secondary throttle until the choke valve reaches a predetermined open position.

17. A charge forming device for internal combustion engines having in combination primary and secondary mixture passages, both of which are adapted to supply combustible mixture to the intake manifold of said engine, means for supplying fuel and air to each of said mixture passages, primary and secondary throttle valves controlling the quantity of combustible mixture supplied by said primary and secondary carburetors respectively, a single operating mechanism for actuating both of said throttle valves sequentially and including means permitting said primary throttle valve to be opened while said secondary throttle valve is held in closed position, a choke valve movable to different positions for variably controlling admission of air to the mixture, means operable by the choke valve when moved to closed position to prevent closing of the primary throttle to the normal idle position so as to increase the engine idling speed, and means whereby the last named means prevents opening of the secondary throttle until the choke valve reaches a predetermined position.

18. A charge forming device for internal combustion engines having in combination primary and secondary mixture passages, both of which are adapted to supply combustible mixture to the intake manifold of said engine, means for supplying fuel and air to each of said mixture passages, primary and secondary throttle valves controlling the quantity of combustible mixture supplied by said primary and secondary carburetors respectively, a single operating mechanism for actuating both of said throttle valves sequentially and including means permitting said primary throttle valve to be opened while said secondary throttle valve is held in closed position, a choke valve movable to different positions to variably control the admission of air to the mixture passage, a cam movable to different positions by said choke valve upon movement thereof and engageable by a stop connected to the primary throttle, whereby the position of said cam determines the closed or idle position of the primary throttle and variably controls the idling speed of the engine in accordance with the position of the choke valve, and means also controlled by said cam for preventing opening of the secondary throttle until the choke valve reaches a predetermined open position.

19. A charge forming device for internal combustion engines having in combination primary and secondary mixture passages, both of which are adapted to supply combustible mixture to the intake manifold of said engine, means for supplying fuel and air to each of said mixture passages, primary and secondary throttle valves controlling the quantity of combustible mixture supplied by said primary and secondary carburetors respectively, a single operating mechanism for actuating both of said throttle valves sequentially and including means permitting said primary throttle valve to be opened while said secondary throttle valve is held in closed position, a choke valve movable to different positions to variably control the admission of air to the mixture passage, a cam movable to different positions by said choke valve upon movement thereof and engageable by a stop connected to the primary throttle, whereby the position of said cam determines the closed or idle position of the primary throttle and variably controls the idling speed of the engine in accordance with the position of the choke valve, a member connected to the secondary throttle and held against movement by said cam until the choke valve has made a predetermined opening movement so as to prevent opening of the secondary throttle until such movement of the choke valve is completed.

20. A charge forming device for internal combustion engines having in combination primary and secondary mixture passages, both of which are adapted to supply combustible mixture to the intake manifold of said engine, means for supplying fuel and air to each of said mixture passages, primary and secondary throttle valves controlling the quantity of combustible mixture supplied by said primary and secondary carburetors respectively, a single operating mechanism for actuating both of said throttle valves sequentially and including means permitting said primary throttle valve to be opened while said secondary throttle valve is held in closed position, a choke valve movable to different positions for variably controlling the admission of air to the mixture passage, means responsive to variations in engine temperature and suction for variably positioning the choke valve and effective to hold the choke valve closed at low temperatures, means operable by the choke valve when moved to closed position to prevent closing of the primary throttle to its normal idle position so as to increase the engine idling speed when the temperature is low, and means whereby the last named means prevents opening of the secondary throttle until the choke valve has made a predetermined opening movement so that the secondary throttle is also held closed at low temperatures.

21. A charge forming device for internal combustion engines having in combination primary and secondary mixture passages, both of which are adapted to supply combustible mixture to the intake manifold of said engine, means for supplying fuel and air to each of said mixture passages, primary and secondary throttle valves controlling the quantity of combustible mixture supplied by said primary and secondary carburetors respectively, a single operating mechanism for actuating both of said throttle valves sequentially and including means permitting said primary throttle valve to be opened while said secondary throttle valve is held in closed position, a choke valve movable to different positions for variably controlling the admission of air to the mixture passage, means responsive to variations in engine temperature and suction for variably positioning the choke valve and effective to hold the choke valve closed at low temperatures, a choke valve movable to different positions for variably controlling the admission of air to the mixture passage, means responsive to variations in engine temeprature and suction for variably positioning the choke valve and effective to hold the choke valve closed at low temepratures, a member operable by the choke valve when moved to closed position to prevent closing of the primary throttle valve to its normal idle position so as to increase the engine idling speed when the temperature is low, and means also controlled by said member for preventing opening of the secondary throttle until the choke valve has made a predetermined opening movement, whereby the secondary throttle is also held closed at low temperatures.

22. A charge forming device for internal combustion engines having in combination primary and secondary mixture passages, both of which are adapted to supply combustible mixture to the intake manifold of said engine, means for supplying fuel and air to each of said mixture passages, primary and secondary throttle valves controlling the quantity of combustible mixture supplied by said primary and secondary carburetors respectively, a single operating mechanism for actuating both of said throttle valves sequentially and including means permitting said primary throttle valve to be opened while said secondary throttle valve is held in closed position, a choke valve movable to different positions for variably controlling the admission of air to the mixture passage, means responsive to variations in engine temperature and suction for variably positioning the choke valve and effective to hold the choke valve closed at low temperatures, a cam movable to different positions by the choke valve during movement of the latter to variably limit the closing movement of the primary throttle and variably control the idling speed of the engine in accordance with the position of the choke valve, and means also controlled by said cam to prevent opening of the secondary throttle until the choke valve has made a predetermined opening movement.

23. A charge forming device for internal combustion engines comprising in combination a housing having a mixture passage therein which is adapted to supply combustible mixture to the engine intake, a constant level fuel supply chamber, a main fuel inlet for supplying fuel to the mixture passage, a main fuel well substantially closed at its upper end and receiving fuel from said fuel supply chamber, a fuel supply tube extending downwardly into said well and delivering fuel to said fuel inlet, said fuel supply tube being supported at its upper end by a member forming a cover for said fuel well, said member being supported on said housing and separated therefrom by a heat insulating gasket to prevent heating of said member by conduction from the housing, a fuel conduit formed in said member leading to said fuel inlet and communicating with said fuel supply tube at the upper end thereof, said fuel supply tube being separated from the wall of the well throughout its length so that said tube is entirely surrounded by fuel in the well and has no metallic contact with a part of said charge forming device except at its upper end, said fuel supply tube being also closed at its lower end and provided with a series of orifices throughout its length to permit flow of fuel or fuel vapor from the well into said tube, and a vent passage formed in the closed upper end of the well to permit escape of fuel vapor from the well.

24. A charge forming device for internal combustion engines having in combination primary and secondary mixture passages adapted to supply combustible mixture to the intake manifold of said engine, means for supplying fuel and air to each of said mixture passages, primary and secondary throttle valves controlling the quantity of combustible mixture supplied by said primary and secondary passages respectively, a mechanism for operating said throttle valve sequentially and including means permitting said primary throttle valve to be opened while said secondary throttle valve is in closed position, a thermostatic stop device for restricting opening of said secondary throttle at low engine temperatures, a lost motion connection between said throttles comprising first and second arms respectively fixed for rotation with said primary and secondary throttles, a lever pivotally mounted with respect to said primary throttle, a resilient connection between said first arm and said lever and a rigid link member articulated between said lever and said second arm whereby said lever and said arm may move in unison.

25. A charge forming device as defined in claim 24 in which said thermostatic stop device includes means for locking said second arm against rotation.

26. A charge forming device for internal combustion engines having in combination primary and secondary mixture passages adapted to supply combustible mixture to the intake manifold of said engine, means for supplying fuel and air to each of said mixture passages, primary and secondary throttle valves controlling the quantity of combustible mixture supplied by said primary and secondary passages respectively, a mechanism for operating said throttle valve sequentially and including means permitting said primary throttle valve to be opened while said secondary throttle valve is in closed position, a thermostatic stop device for restricting opening of said secondary throttle at low engine temperatures, a lost motion connection between said throttles comprising first and second arms respectively fixed for rotation with said primary and secondary throttles, a lever pivotally mounted with respect to said primary throttle, a resilient connection between said first arm and said lever and a rigid link member articulated between said lever and said second arm whereby said lever and said arm may move in unison, a choke valve controlling admission of air to said charge forming device, a member positioned by said choke valve when the latter is in closed position to bring about an increase in the idling speed of the engine, said member being adapted to coact with and lock said second arm against movement, said thermostatic stop device being operatively connected to said member and adapted to move said member out of coacting engagement with said second arm.

References Cited in the file of this patent

UNITED STATES PATENTS

| | | |
|---|---|---|
| 1,833,196 | Aseltine | Nov. 24, 1931 |
| 1,906,278 | Montgomery | May 2, 1933 |
| 2,055,925 | Firth | Sept. 29, 1936 |
| 2,193,533 | Kishline et al. | Mar. 12, 1940 |
| 2,201,603 | Wirth | May 21, 1940 |
| 2,215,683 | Wirth | Sept. 24, 1940 |
| 2,316,882 | Moseley et al. | Apr. 20, 1943 |
| 2,328,763 | Winkler | Sept. 7, 1943 |
| 2,390,019 | Winkler et al. | Nov. 27, 1945 |
| 2,418,011 | Carlson | Mar. 25, 1947 |
| 2,452,698 | Strebinger | Nov. 2, 1948 |
| 2,615,696 | Winkler | Oct. 28, 1952 |
| 2,640,472 | Bicknell | June 2, 1953 |
| 2,715,522 | Carlson et al. | Aug. 16, 1955 |

Disclaimer 2,771,282.—*Elmer Olson* and *Lawrence C. Dermond*, Rochester, N.Y. CAR-
BURETOR. Patent dated Nov. 20, 1956. Disclaimer filed July 20, 1959,
by the assignee, *General Motors Corporation*.
Hereby enters this disclaimer to claim 14 of said patent.
[*Official Gazette September 8, 1959.*]